United States Patent Office 2,783,856
Patented Mar. 5, 1957

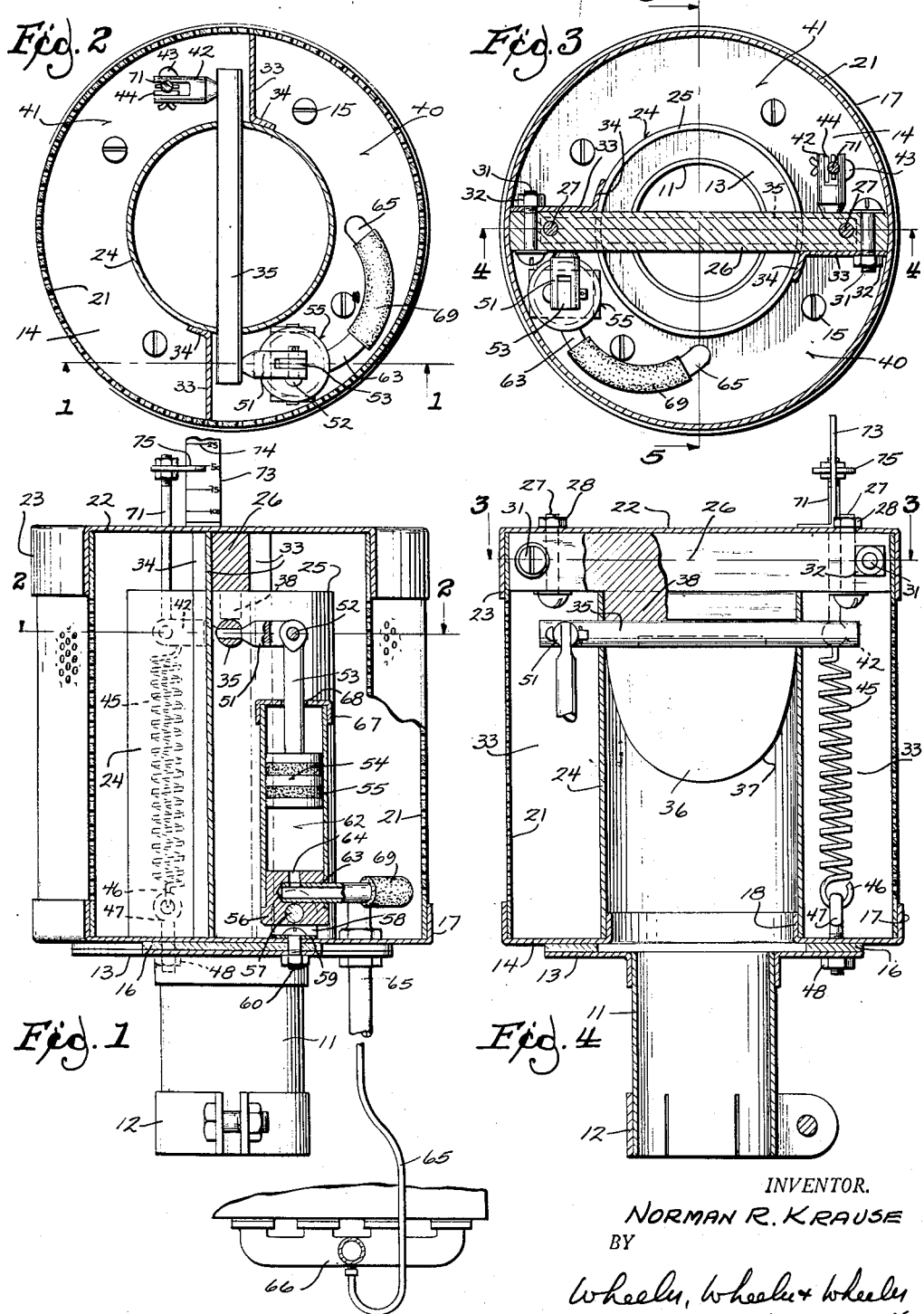

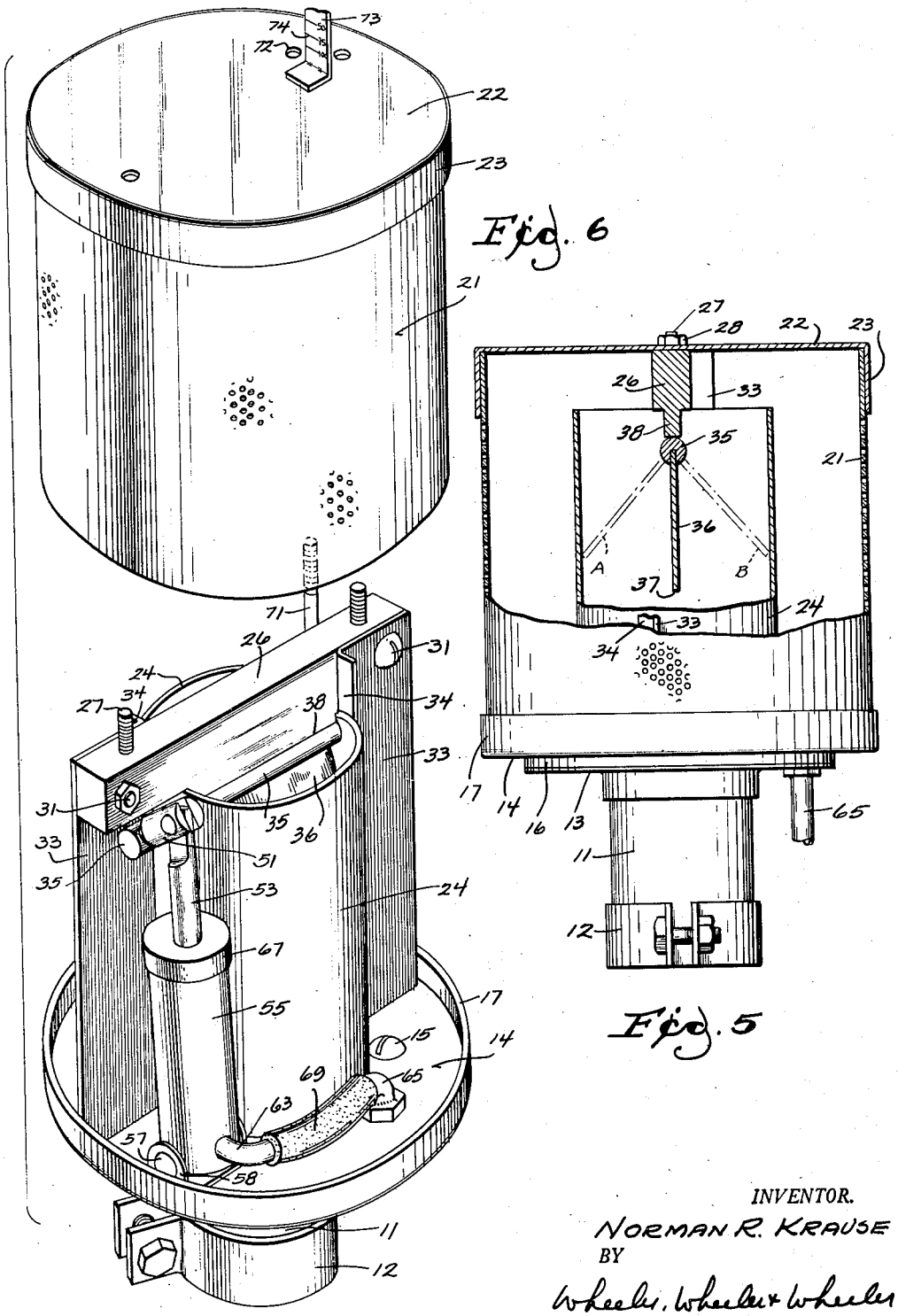

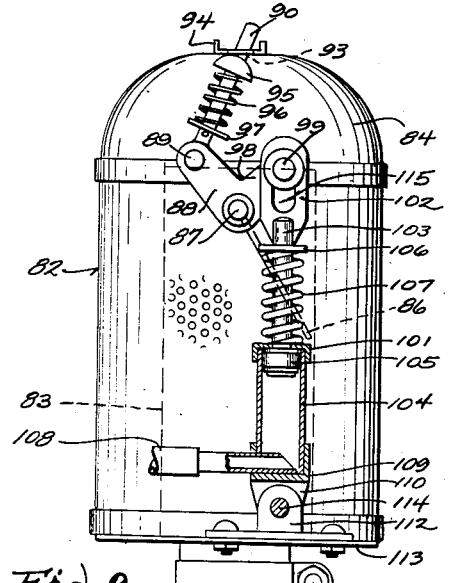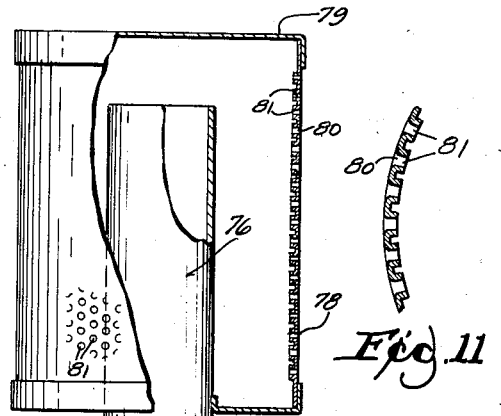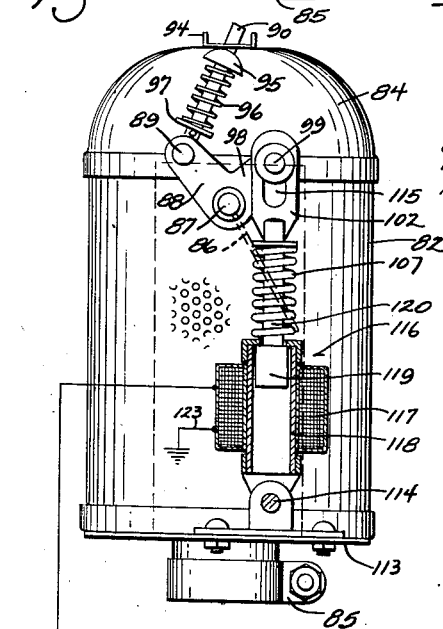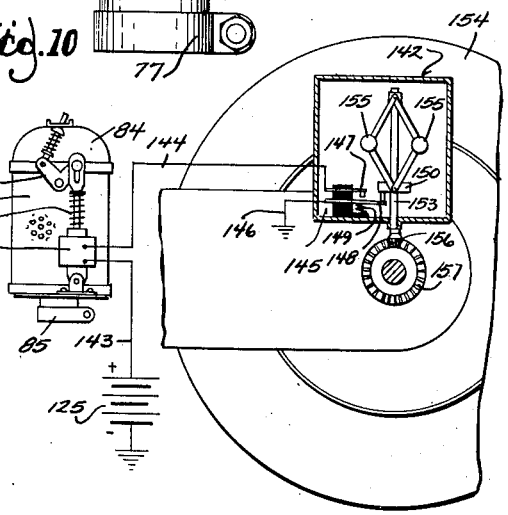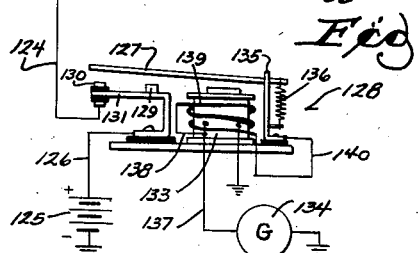

2,783,856

SELF-CLEANING SCREENS OR FILTERS

Norman R. Krause, Racine, Wis.

Application December 24, 1953, Serial No. 400,267

25 Claims. (Cl. 183—53)

This invention relates to self-cleaning screens or filters and particularly to an improvement over the filter disclosed in my prior Patent No. 2,451,227 granted October 12, 1948.

As in the case of the device disclosed in my prior patent aforesaid the invention has particular utility when used as a pre-cleaner for internal combustion engines in agricultural machinery and the like. An object of the invention is to provide a screen or filter having valve means for alternating the course of intake air through the filter as described in my prior patent aforesaid, but in which the valve is actuated according to normal variations in the conditions of vehicle operation. In the preferred embodiment of the invention the valve is actuated according to variations in the degree of vacuum in the intake manifold of the engine. In other embodiments the valve may be actuated according to vehicle speed, generator output, etc. Being controlled according to engine function the device is completely automatic in operation and requires no attention on the part of the operator. Normal changes in the conditions of vehicle operation, such as changes in load imposed upon the engine in starting, stopping, operating the agricultural machine powered by the engine through heavy and light loads, etc. will so vary the degree of vacuum in the intake manifold as to actuate the valve of my preferred device to alter the course of air flowing through the screen and thereby result in clearing the screen of accumulated debris.

The device of the present invention has simpler working parts and the cost of tooling for the present device is less than half the cost of tooling for the device of my prior patent aforesaid.

I also incorporate in the device of the present invention a novel screen having a highly polished surface of substantial area compared to the perforations therethrough whereby most of the dust tending to enter the screen ricochets off the polished surface and away from the filter. I may optionally provide the screen with inwardly extending margins about the perforations to smooth the flow of air therethrough to discourage any accumulation of dust etc. which might otherwise tend to block the perforations.

In the drawings:

Fig. 1 is a vertical cross sectional view through the preferred embodiment of my invention and taken along the line 1—1 of Fig. 2.

Fig. 2 is a horizontal cross section taken along the line 2—2 of Fig. 1.

Fig. 3 is a horizontal cross section taken along the line 3—3 of Fig. 4.

Fig. 4 is a vertical cross section taken along the line 4—4 of Fig. 3.

Fig. 5 is a vertical cross section taken along the line 5—5 of Fig. 3.

Fig. 6 is a perspective view of the preferred embodiment of my invention, the outer cylinder being shown in spaced relation to the remainder of the device to expose details of construction.

Fig. 9 is a side elevational view of a modified embodiment of the invention, portions of the vacuum cylinder being shown in vertical cross section.

Fig. 10 is a view partly in elevation and partly in vertical cross section showing an air filter incorporating the novel perforated screen of the invention.

Fig. 11 is a fragmentary horizontal cross section taken through the screen of Fig. 10.

Fig. 12 is a side elevational view of another modification of the invention in which a solenoid is used to actuate the valve, the solenoid being shown in cross section and a portion of the tractor electrical system to which the solenoid is connected being shown diagrammatically.

Figure 7:
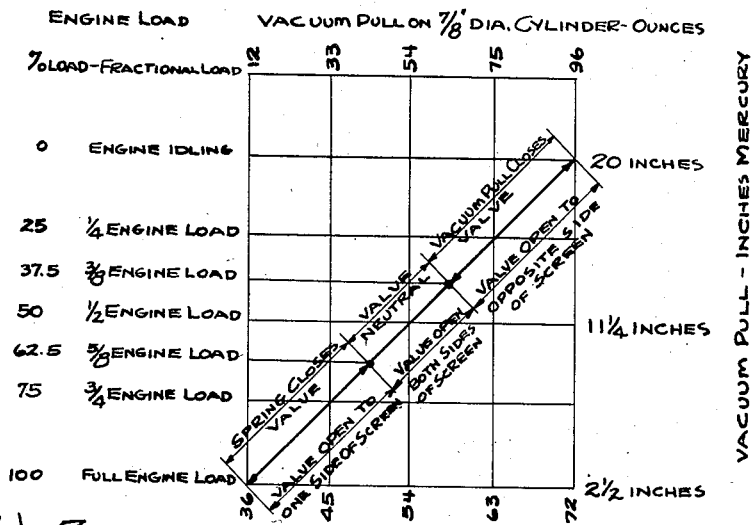
Fig. 7 is a chart relating the degree of load on the engine to the degree of vacuum in the vacuum cylinder, the vacuum pull on the valve, and the position of the valve in the preferred embodiment of the invention.

Fig. 13 diagrammatically illustrates a still further modification of the invention in which the valve operating mechanism is responsive to changes in speed of the vehicle.

The preferred embodiment of the invention shown in Figs. 1–8 will be first described. The modified embodiments of the invention shown in Figs. 9 through 13 will be described thereafter.

The pipe 11 may be connected by means of the collar 12 either directly to the engine carburetor (not shown) or more conventionally to an oil bath air filter which in turn is connected to the carburetor. At the upper end of pipe 11 I provide a broad annular flange 13 upon which the annular cup 14 is mounted with the intervening gasket 16 by means of the nuts and bolts indicated generally as 15. The cup 14 is provided with an outer upturned flange 17 and an inner upturned flange 18.

Within the outer flange 17 I provide an outer perforate cylinder 21 which constitutes in my device a screen against which coarse material such as straw, chaff, leaves, etc. will accummulate under pressure of air entering the filter. At the top of the device I provide a cap 22 having a down-turned peripheral flange 23 which embraces the upper margin of the outer cylinder or screen 21.

Concentric with outer cylinder 21 I provide an inner imperforate cylinder 24. The lower margin of the inner cylinder 24 telescopically engages the outer surfaces of inner flange 18 of the annular base cup 14. The upper edge 25 of the inner cylinder 24 is spaced below the level of the the top 22. The outer and inner cylinders 21, 24 are stabilized in their concentric positions by an upper cross member 26 which extends diametrically across the upper edge 25 of the inner cylinder and is provided with upwardly extended threaded studs 27 to clamp the top 22 to the cross member 26 by means of nuts 28 which engage the studs 27.

The cross member 26 is also provided with laterally disposed bolts 31 and nuts 32 which anchor partition strips 33 to divide the space between the inner and outer cylinders into separate filter chambers 40 and 41. The strips 33 are provided with inturned flanges 34 which are curved to engage the outer periphery of the inner cylinder 24. The strips are otherwise disposed generally radially and are desirably positioned at opposite sides of the cross member 26 as best shown in Fig. 3. Thus the partition strips are positioned not to interfere with the rock shaft 35 and the action of cranks 42 and 51, as hereinafter explained.

The cylinder 24 is suitably apertured to provide spaced bearings for rock shaft 35 from which valve 36 is pendant as best shown in Figs. 4 and 5. The ends of rock shaft 35 extend beyond the cylinder 24 and at opposite sides of the partitions 33, as shown in Figs. 2 and 4. The valve 36 comprises a plate having edge margin 37 curved to engage and seal the inner periphery of the inner cylinder 24 when the valve is in either of the dotted line positions A or B shown in Fig. 5.

As best shown in Figs. 4 and 5 the cross member 26 is also provided with a depending baffle 38 against the lower surface of which the rock shaft 35 bears in substantially air tight contact. Accordingly, when the valve 36 is in either dotted line position A or B, one or the other of chambers 40 or 41 is exposed to the interior of the inner cylinder, and the other of said chambers is sealed therefrom. The interior of the cylinder 24, of course, provides an exhaust passage for the chambers 40, 41 and is in communication through the pipe 11 to the oil bath filter aforesaid. As more fully explained in my prior patent aforesaid, shifting of the valve 36 from one of its closed positions to the other will automatically cut off air flow through the screen about the blocked chamber and permit debris accumulated on the outer surface thereof to fall by gravity or be shaken off by engine vibration, thus cleaning the screen. Reversing the position of the valve cleans the screen about the other chamber and the engine is assured a constant supply of air.

The position of the valve 36 is changed in response to changes in the degree of vacuum in the intake manifold of the engine. At one end of rock shaft 35 and one side of the rock shaft axis I provide a bifurcated crank 42 having a cross pin 43 to which one end 44 of tension spring 45 is connected. The other end 46 of the spring 45 is anchored on the eye bolt 47 having a threaded portion anchored in the base cup 14 and adjustable by manipulation of the nut 48 threaded to bolt 47. Thus the tension on the spring may be adjusted.

Spring 45 biases the valve 36 toward position A for closure of chamber 40. At the other end of the rock shaft 35 and the other side of the rock shaft axis I provide a bifurcated crank 51 having a cross pin 52 to which is pivotally connected the rod 53 of piston 54 within vacuum cylinder 55. Cylinder 55 is provided with a top cap 67 having an opening 68 for the piston rod 53. The opening 68 is sufficiently large to maintain the upper surface of piston 54 under atmospheric pressure. The base of cylinder 55 is closed by a plug 56 having a pivotal connection on pin 57 to the spaced upright ears 58 of a bracket having its base web portion 59 anchored to the base cup 14 by means of the nut and bolt 60. The respective pintles 52 and 57 permit the piston rod and cylinder to oscillate slightly in a vertical plane upon actuation of the piston and movement of the crank arm 51 about the axis of oscillation of the rock shaft 35.

The plug 56 at the base of the vacuum cylinder 55 is suitably bored to receive a lateral tube 63 which communicates through port 64 with the vacuum chamber 62 between the plug 56 and the piston 54 within the cylinder 55. The exposed end of the tube 63, which may be curved as illustrated to complement the curve of the outside cylinder screen 21, may be connected by a flexible tube 69 to the projecting end of tube 65 rigidly mounted in the base of cup 14. The upper end of tube 65 may be curved toward tube 63, as illustrated. The flexible tube 69 is made of rubber or plastic or the like and permits the slight oscillation of cylinder 55 as hereinbefore explained.

Tube 65 continues to a connection with the intake manifold 66 of the internal combustion engine. The manifold is shown only diagrammatically as the manifold per se constitutes no part of the present invention.

As is well understood in this art the pressure in the intake manifold varies greatly in accordance with the load imposed upon the engine. Based on atmospheric pressure the manifold is under some degree of vacuum whenever the engine is operating and drawing air through the manifold into the engine cylinders. At light loads the conventional engine throttle (not shown) is almost closed. Accordingly there is a high degree of vacuum in the manifold. At heavy loads the throttle is nearly open and there is accordingly a relatively low degree of vacuum in the manifold.

As tubes 63, 64 and 69 provide a direct connection between the vacuum chamber 62 within cylinder 55 and the manifold 66, the degree of vacuum in chamber 62 will correspond to that existing in the manifold for any particular load imposed upon the engine. As the engine load varies widely in the normal operation thereof, chamber 62 will be subject to equally variant degrees of vacuum. The pressure of spring 45 is so adjusted with reference to the pressure differentials on piston 55 that the piston is actuated in one direction when manifold vacuum is high and in the opposite direction when the vacuum is low.

Accordingly, atmospheric pressure on the upper surfaces of piston 55 will tend to move the valve 36 toward position B against the tension of spring 45 when there is a high degree of vacuum in the chamber 62, as is the case at low engine speeds, as when the engine is idling. In this situation the air supplied to the engine will pass through the screen portion enclosing chamber 40 and the screen portion enclosing chamber 41 will not be subject to air pressure. Thus any chaff, etc. which has accumulated on the screen about chamber 41 will fall by gravity or be shaken off by vibration of the engine.

However, when the engine is placed under relatively heavy load, as when the agricultural implement powered by the engine is operating in a heavy stand of grain or the like, the degree of vacuum in chamber 62 will be relatively low and the tension of spring 45 will be sufficient to shift the valve 36 to position A. Now the chaff and straw accummulated on the screen portion enclosing chamber 40 may fall or be shaken off and all air supplied to the engine will pass through the screen enclosing chamber 41.

Over a relatively small range of intermediate loads on the engine the tension on the spring 45 will approximately balance the vacuum in chamber 62 and the valve 36 may assume its full line intermediate position shown in Fig. 5. In this position of the valve both screen portions enclosing chambers 40 and 41 are open to the pipe 11. The valve, however, will normally occupy this intermediate position only in the course of its movement between positions A and B. Since both chambers 40 and 41 are then open to the pipe 11 there is no possibility of starving the engine during the movement of the valve from one position to the other.

In Fig. 7 I show a chart which relates the percent of engine load to the vacuum pull in ounces on the piston 54. This chart is based upon actual measurements on an engine to which my self-cleaning filter was applied in a series of laboratory tests. In the particular machine from which the chart was prepared the cylinder 55 was seven-eights of an inch inside diameter. The readings of vacuum pressure were made on a mercury gauge. The pull in ounces on the piston was computed in terms of the difference in the pressures at opposite sides of the piston and the diameter of the piston. The pull of the balancing spring 45 is noted along the lower margin of the chart. This pull, of course, varies in accordance with the elongation of the spring. As indicated on the chart there is a substantially straight line relationship between the position of the valve and the percentage of engine load.

Figure 8:
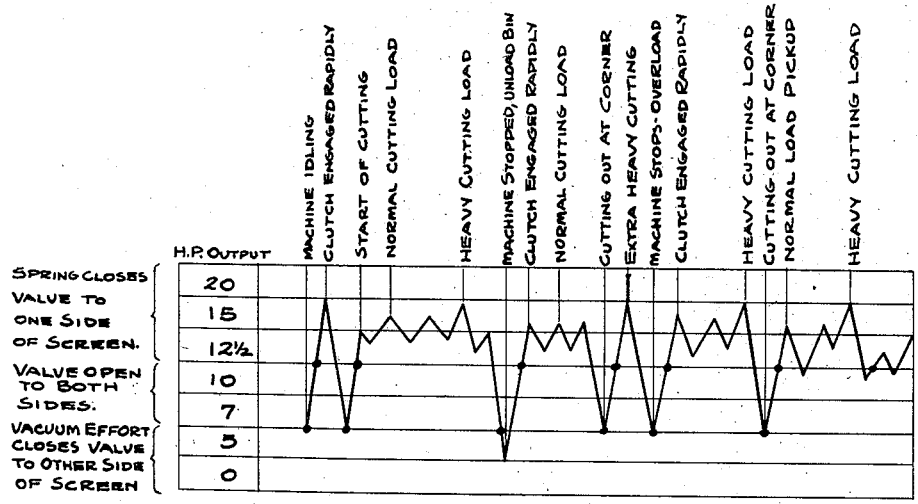
Fig. 8 is a chart which relates various normal operational conditions to which the engine is subjected to the output of the engine and the position of the valve in the preferred embodiment of the invention.

Fig. 8 is a chart diagrammatically showing the position of the valve with respect to typical operations of a six foot combine having an engine equipped with my pre-filter. The various conditions of operation are indicated on the chart and these conditions are related to the horse power output of the engine and to the position of the valve. As indicated the valve will move from one position to the other many times during the operation of the engine. The total length of the chart represents approximately fifteen minutes of engine operation there being eleven changes in the position of the valve indicated for this typical operation.

An optional feature of my device which is nevertheless particularly useful where the agricultural implement operates in heavy dust resides in the use of a polished specially constructed screen 21. The screen comprises a foraminous tube, normally cylindrical, in which the openings constitute less than one-half and desirably only about thirty-three percent of the area of the screen. The remaining area of the screen is of chrome plated sheet metal, desirably polished, which deflects air-entrained dust tending to enter the filter particularly when such dust approaches the filter tangentially or at some acute angle. Thus the screen not only filters out coarse material, as hereinbefore explained, but also materially reduced by deflection the fine dust and other grit, etc. which would otherwise pass through the filter to the oil bath. Moreover, as the inner cylinder 24 is closed except near its top, and the enclosed space is large, much of the dust, etc. which does enter through the openings of the screen will settle by gravity to the bottom of the space between the concentric inner and outer cylinders thus further reducing the amount of dust which passes over the top of inner cylinder 24 en route to pipe 11.

As best shown in Figs. 10 and 11 the screen margins 80 bordering the perforated openings 81 may be inwardly extended to constitute air admission channels. Thus, there are no sharp edges about the openings on which dust, such as cotton lint, milk weed seeds, etc., may accumulate to block the openings, and air passing through the screen will be smoothly channeled through the openings. In the preferred embodiment of the invention, I have found that very satisfactory results are obtained if the openings 81 are $\frac{1}{32}$ inch in diameter. If these openings are formed by punching, the inward projections 80 represent the burr left by the punch at the inner surface of the cylinder.

In Fig. 10 I disclose the use of my novel screen in a pipe air filter (without valve 36) which simply comprises an inner pipe 76 having a coupling 77 to the carburetor air inlet or oil bath the outer screen 78 comprising the foraminous structure described in the preceding paragraph. The outer screen 78 is further provided with a rain excluding cap 79. As used in this simple type of air filter my novel screen will greatly reduce the amount of dust entering the carburetor because of the deflection of dust from the polished outer surface of the screen 78. Moreover, as hereinbefore explained, little or no dust will accumulate about the openings 81 because of the smooth channeling or streamlining of the air flowing therethrough.

I may also optionally provide my air filter with an indicator rod 71 which extends through an appropriate opening 72 in the top cap 22 of the device. The rod 71 may be pivotally connected to the pin 43 adjacent the connection thereto of spring 45. Thus rod 71 reciprocates vertically in accordance with the oscillation of the rock shaft 35. The top cap 22 may be provided with an upright scale 73 bearing calibrations 74 to indicate the position of the valve 36. Rod 71 is provided with a pointer 75 which moves over the calibrations 74 for this purpose. As the valve moves according to load and engine power output, the pointer may also be observed to give approximate readings of load and engine power output.

It is to be particularly noted that in the embodiment of Figs. 1–6 all parts of my filter except vacuum line 65 and the projecting portion of indicator rod 71 are enclosed within the outer screen 21. There is nothing for the operator to adjust and no mechanical device to get out of order, the valve being actuated solely by the degree of vacuum in the manifold.

The modified embodiment of the invention shown in Fig. 9 illustrates a construction in which the vacuum actuator and associated parts are all disposed externally of the outer cylinder 82. In other respects the device is similar to the embodiment of Figs. 1–6. In addition to the outer cylinder 82 there is an inner cylinder 83, a top cap 84, a coupling 85 for mounting the device on the carburetor and a flap valve 86 within the inner cylinder 83. The valve 86 is provided with a rock shaft 87 which is provided externally of the screen 82 with a bell crank having one arm 88 pivotally connected at 89 with a toggle rod 90 which is slidable through opening 93 in a bracket 94 which laterally extends from its mounting on the top of the cap 84. Slidable on the rod 90 is a spring seat 95 which receives one end of toggle compression spring 96, the other end of the spring 96 being seated against the plate 97 which has a relatively fixed position on the rod 90.

The other arm 98 of the bell crank is provided with a crank pin 99 slidably engaged with a coupling 102 which is welded or otherwise fixed to the upper end of a piston rod 103 having a piston 105 in vacuum cylinder 104. The rod 103 is provided with a spring seat disk 106 against which a compression spring 107 reacts from its opposed seat on cylinder cap 101 to bias the rod upwardly.

Cylinder 104 is connected through the vacuum line 108 to the intake manifold of the engine, as in the device of Fig. 1. The cylinder base cap 109 is provided with an ear 110 pivotally connected to the pivot pin 114 carried by bracket 112 on base plate 113.

The bell crank arms 88, 98, rod 90 and compression spring 96 comprise a toggle for snapping the valve 86 beyond the dead center position of the toggle for positive closure of the valve. To accommodate for the snap action of the toggle the coupling 102 is provided with a vertically elongated slot 115.

When vacuum is applied to the cylinder 104 the piston will be drawn downwardly against the combined bias of compression spring 107 and toggle spring 96. As soon as the toggle and valve passes the dead center position of the toggle, valve 86 will be snapped by toggle spring 96 to its extreme position, the crank pin 99 being free to move through the range of slot 115 in coupling 102 to permit this snap action. Upon release of vacuum in the cylinder 104 spring 107 will raise the piston 103 (against the bias of toggle spring 96 which is of less strength than spring 107) to reverse the action of the valve 86, and to ultimately throw the toggle beyond dead center to snap the valve 86 to its opposite extreme position.

Unlike the device of Figs. 1–6, in which the bias spring 45 is at the end of valve shaft 35 opposite the connection to the shaft of the piston 53, in the device of this embodiment both the bias spring 107 and the piston rod 103 are connected to the same end of the valve shaft 87. Moreover, in this embodiment of the invention, all of these parts are exposed for easy access in the event repair or replacements of parts becomes necessary.

The embodiment of Fig. 12 is quite similar to that of Fig. 9 except for the substitution of a solenoid actuator 116 for the vacuum cylinder 104. It is to be understood, of course, that the solenoid 116 and connections about to be described and be substituted for the vacuum cylinder 55 of the device of Figs. 1–6. The solenoid comprises a electromagnetic coil 117 which is wound about a non-magnetic sleeve 118 which provides a guide tube for the armature 119 which is mounted at the end of actuator rod 120. In other respects the air filter, valve and toggle is substantially identical to the device shown in Fig. 9 and the various parts are assigned the same reference characters in the drawings.

In the modification of Fig. 12, however, the valve 86 is actuated according to variations in the electrical output of the tractor generator 134. The circuit to the electromagnetic coil 117 includes a grounded line 123 and a line 124 which may be intermittently connected to the positive terminal of battery 125. This connection is completed through line 126, the arm 131 of generator cut out 128, the armature 127 of the generator cut-out, and contacts 129 and 130 which are bridged by armature 127 when generator voltage is above a predeterminal minimum. The contact 130 is insulated from the generator cut-out arm 131.

The generator cut-out conventionally comprises a coil 133 connected to the tractor generator 134 through line 137 and ground. The armature 127 is pivotally mounted on bracket arm 135 and biased by the tension spring 136 to the position shown in Fig. 12. Thus when the tractor engine is rotating at low speed with consequent low voltage generated by the generator, the coil 133 will not have sufficient magnetism to attract the armature 127. The battery 125 is thereby disconnected from the generator. However, when the speed of the engine is such as to magnetize the coil 133 sufficiently to attract armature 127, the armature 127 will close and the battery 125 will be charged through line 137, line 138, coil 139, line 140, arm 135, armature 127, contact 129, arm 131 and line 126.

Closure of the armature 127 will also connect the electromagnetic coil 117 of solenoid 116 in circuit with the battery 125 to pull the solenoid armature 119 within the coil to operate the toggle and flip the valve 86 from the position to the other. However, as soon as the engine and generator speed drops below that necessary to hold the armature 127 in bridging connection with the contacts 129 and 130, the circuit from the electromagnetic coil 117 to the battery 125 will be broken, the coil 117 de-energized, and the bias spring 107 will return the valve 86 to its initial position.

From the foregoing it is clear that in the device of Fig. 12 the valve 86 will operate in response to engine speed, as translated by the generator and generator cut-out into intermittent actuation of the solenoid 116.

In Fig. 13 I show a further modification of the device of the invention, in which the valve actuator is responsive directly to the speed of the vehicle. The air filter, valve, and its actuating solenoid 116 is substantially identical to that shown in Fig. 12 and will not be further described. Here, however, the tractor battery 125 is connected directly to one terminal of the solenoid through line 143, the other terminal of the solenoid coil being connected by line 144 through a spring biased contactor 145 having arms 147, 148, and line 146 to ground.

Arm 147 of contacter 145 is stationary and arm 148 is biased by spring 149 toward contact with arm 147. The position of arm 148 is dictated by a governor mechanism enclosed in housing 142 which also encloses the contacter 145. The governor comprises a weight 150 slidable on the governor shaft 153. The governor further comprises weights 155 which are connected for rotation with the shaft 153 as powered by pinion 156 meshing with ring gear 157 on the tractor wheel 154. The weight 150 normally depresses arm 148 to hold the arms 147 and 148 out of contact, thus breaking the circuit from the battery to the solenoid. However, when the speed of rotation of the tractor wheel 154 increases beyond a certain predetermined minimum, the weight 155 will rise to lift weight 150 and permit spring 149 to close the contacts 147, 148 thus energizing the solenoid 116 and actuating the valve as hereinbefore described. When the speed of tractor wheel rotation drops below that necessary to lift the weight 150, contact arm 148 will be depressed to open the circuit and de-energize the solenoid. Bias spring 107 will then return the valve to its opposite extreme position.

I claim:

1. In a device of the character described including an engine having an intake manifold subject to vacuum of varying degree, an air filter having means providing an air passage, a plurality of screened chambers in the path of air flowing to said air passage and a valve mounted for movement respecting said chambers to selectively block and admit air to said passage through the respective screened chambers, the improvement which comprises a vacuum actuator for said valve and a vacuum connection to the engine manifold whereby the valve is moved in accordance with changes in the degree of vacuum in said manifold, said actuator comprising means for moving said valve in a range intermediate extreme conditions of engine operation, the valve remaining closed during said extreme conditions.

2. The device of claim 1 in which said improvement further comprises a spring and connection from said spring to said valve to bias said valve towards a position in which one of said chambers is open to the air passage and another of said chambers is blocked from said air passage, said vacuum actuator constituting means for overcoming the bias of said spring to shift said valve toward a position in which said other chamber is open to the air passage and said one chamber is blocked therefrom, the valve having travel between said positions sufficient to expose both said chambers to said air passage during a substantial range of variation of the degree of vacuum in said manifold.

3. In a device of the character described, including an engine having an intake manifold subject to vacuum of varying degree, the combination with an air filter having means providing an air passage, a plurality of screened chambers in the path of air flowing to said air passage and a valve mounted for movement respecting said chambers to selectively block and admit air to said passage through the respective screened chambers, of a vacuum actuator for said valve and a vacuum connection to the engine manifold whereby the valve is moved in accordance with changes in the degree of vacuum in said manifold, said chambers comprising concentrically spaced inner and outer cylinders and partitions bridging the space between said cylinders at opposite sides of the cylinder axis, said valve being mounted within said inner cylinder for movement between extreme positions in which one of said chambers is open to the air passage and the other of said chambers is blocked therefrom, said inner cylinder being imperforate below said valve but open above said valve to the chamber spaces between the inner and outer cylinders, the said outer cylinder being perforate to constitute said screens.

4. The device of claim 3 in which the perforations in the outer cylinder constitutes less than one-half of the area of the cylinder whereby imperforate areas tend to deflect away from said chamber a substantial quantity of dust which might otherwise be drawn through the screen into the chamber.

5. The device of claim 3 in which the valve actuating means is provided with an indicator projecting externally of the device and a scale with relation to which the indicator moves to indicate the degree of vacuum in said manifold.

6. The device of claim 3 further comprising a rock shaft on which said valve is mounted within said inner cylinder and a cross member across the top of the inner cylinder and connected with said partitions, said cross member comprising a baffle in substantially air tight engagement with the rock shaft whereby to seal one chamber from the other when the valve is in one or another of its extreme positions.

7. The device of claim 3 further comprising a rock shaft on which said valve is mounted within said inner cylinder and a cross member across the top of the inner cylinder and connected with said partitions, said cross member comprising a baffle in substantially air tight engagement with the rock shaft whereby to seal one chamber from the other when the valve is in one or another of its extreme positions, said baffle and rock shaft being disposed in the same plane through the axis of the cylinders, said actuator further comprising a spring disposed in one of said chambers at one side of said plane and having connections to said valve to bias said valve toward one of its extreme positions, said vacuum actuator comprising a vacuum cylinder and piston disposed in the other of said chambers at the other side of said plane.

8. The device of claim 7 in which the valve rock shaft is connected to said vacuum cylinder piston, said connection comprising a crank connected to the rock shaft and a pivot between the crank and piston, the connections of the spring to the valve including a crank on said rock shaft and a pivot between the crank and the spring, said cranks projecting laterally from the rock shaft and at opposite ends thereof, said partitions being offset from the axis of the rock shaft opposite the projections of the cranks therefrom.

9. The device of claim 8 in which said vacuum cylinder is provided with a pivotal anchorage at its end opposite the piston rod whereby said vacuum cylinder may oscillate on said pivots upon actuation of the crank by said piston.

10. The device of claim 9 in which said vacuum connection to the engine comprises a tube passing through the chamber in which said vacuum cylinder is disposed, a tube extending through the vacuum cylinder in communication with a vacuum chamber therein, and a flexible tube connecting said tubes to accommodate oscillation of the vacuum cylinder aforesaid.

11. A chaff-filter attachment for an internal combustion engine having an intake manifold, said filter comprising a plurality of screened chambers, air outlets from said chambers to a common branch, and valve means controlling the passage of air through said outlets to said branch, said valve means having one position in which the air outlet of one chamber is open to the branch and the air outlet of the other chamber is closed to the branch and another position in which the air outlet of said one chamber is closed to the branch and the air outlet of said other chamber is open to the branch, said valve means comprising a rock shaft, a spring connected to the rock shaft and biasing said valve toward one of said positions, a vacuum cylinder and piston having a motion transmitting connection to said rock shaft, said vacuum cylinder having a connection to the intake manifold of the engine whereby the vacuum in the cylinder corresponds to the vacuum in the manifold, said piston being arranged so that increase in vacuum tends to move said valve against the bias of the spring and toward the other of said positions, the bias of the spring being such that the valve will move when the engine is operating in an intermediate range of engine operation and will remain closed in extreme ranges of engine operation.

12. A pre-filter attachment for an internal combustion engine having an intake manifold, said filter comprising a plurality of screened chambers, air outlets from said chambers to a common branch, and valve means controlling the passage of air through said outlets to said branch, said valve means having one position in which the air outlet of one chamber is open to the branch and the air outlet of the other chamber is closed to the branch and another position in which the air outlet of said one chamber is closed to the branch and the air outlet of said other chamber is open to the branch, said valve means comprising a rock shaft, a spring connected to the rock shaft and biasing said valve toward one of said positions, a vacuum cylinder and piston having a motion transmitting connection to said rock shaft, said vacuum cylinder having a connection to the intake manifold of the engine whereby the vacuum in the cylinder corresponds to the vacuum in the manifold, said piston being arranged so that increase in vacuum tends to move said valve against the bias of the spring and toward the other of said positions, said screened chambers comprising inner and outer concentric cylinders and partition means extending generally axially and disposed between the inner and outer cylinders to divide the space between said cylinders to said chambers, said outer cylinder comprising a foraminous screen exposed to the atmosphere, said inner cylinder comprising said common branch within which said rock shaft and valve is mounted.

13. The device of claim 12 in which the outer cylinder is provided with a top cap, the upper end of the inner cylinder being spaced from said cap, the rock shaft having bearings in said inner cylinders, said inner cylinder being imperforate below said bearings whereby all air drawn through the foraminous outer screen must travel between the top cap and the upper end of the cylinder for passage through said inner cylinder.

14. The device of claim 12 in which the outer cylinder is provided with perforations which constitute less than one-half the area of the outer cylinder, whereby said cylinder provides substantial surface area against which incoming dust may be deflected.

15. The device of claim 12 in which said rock shaft has a substantial arc of rotation between said positions of said valve whereby both said chambers are exposed to said air intake passage during movement of said valve between said positions.

16. In a device of the character described and including concentrically spaced inner and outer cylinders providing a chamber in the space between said cylinders, said inner cylinder being provided with a valve and being imperforate below said valve and open to the chamber above said valve, said outer cylinder being perforate to constitute a screen, a rock shaft upon which said valve is movable within said inner cylinder, a crank arm for the rock shaft, a vacuum cylinder having a pivotal anchorage at one end and having a piston rod with a pivotal connection to said crank at its other end whereby actuation of the piston will oscillate said vacuum cylinder on said pivots, a tube projecting from the vacuum cylinder, a tube leading from said chamber between said inner and outer cylinders and having an external connection with a source of vacuum, and a flexible tube connecting said tubes within the space between said cylinders whereby to permit oscillation of said vacuum cylinder on said pivots.

17. In a device of the character described, vehicle apparatus, said apparatus requiring a supply of air and means providing an air passage thereto, a plurality of screened chambers in the path of air flowing to said air passage and a valve mounted for movement respecting said chambers to selectively block and admit air to said passage through the respective screened chambers, the improvement which comprises a power operated actuator for said valve and means for powering said actuator according to variable conditions of vehicle operation, said actuator comprising means for moving said valve in a range intermediate extreme conditions of vehicle operation, the valve remaining closed during said extreme conditions.

18. The device of claim 17 in which the vehicle has an engine with a manifold and the actuator comprises a vacuum motor and a connection from said motor to an engine manifold whereby the valve is actuated in accordance with changes in the degree of vacuum in said manifold.

19. The device of claim 17 in which the vehicle comprises an engine having a generator and a battery and a charging circuit including an electromagnetic cut-out, the actuator comprising a solenoid having an armature connected to the valve, said solenoid having electrical connections controlled by said cut-out.

20. The device of claim 17 in which the vehicle is provided with an engine having means for controlling its speed, the valve actuator aforesaid having control means for operating the actuator in accordance with variations in engine speed.

21. In a vehicle engine air filter comprising means providing an air passage, a plurality of screened chambers in the path of air flowing to said air passage and a valve mounted for movement respecting said chambers to selectively block and admit air to said passages through the respective screened chambers, the improvement which comprises an actuator for said valve, said actuator comprising a bell crank mounted on said shaft, a toggle link mounted on one arm of said bell crank, a power operator mounted to the other arm of said bell crank whereby actuation of said power operator will rotate said shaft against the bias of the toggle link until the toggle is oscillated through dead center whereupon the toggle will snap the valve to extreme position said power actuator having means for powering it according to variable conditions of vehicle engine operation.

22. The device of claim 21 in which said power operator comprises a vacuum cylinder and a connection from said cylinder to the engine manifold whereby the valve is moved in accordance with the degree of vacuum in said manifold.

23. The device of claim 21 in which said power actuator comprises a solenoid having an electromagnetic coil, and a control circuit for said coil including an electric current source and a voltage-regulated current cut-out whereby said coil is energized in accordance with the position of said cut-out.

24. The device of claim 21 in which said power actuator comprises a solenoid, an electric current source, and a circuit including said solenoid, electric current source, and a set of circuit interrupting contacts actuated according to vehicle speed.

25. The device of claim 21 in which said power actuator is provided with an operator and a bias spring biasing said operator in the same direction as the bias of the toggle spring whereby said actuator must overcome the bias of both said springs to move the valve.

References Cited in the file of this patent
UNITED STATES PATENTS

| | | |
|---|---|---|
| 1,669,413 | Donaldson | May 15, 1928 |
| 1,842,316 | Coulter | Jan. 19, 1932 |
| 2,451,227 | Krause | Oct. 12, 1948 |
| 2,509,778 | Moler | May 30, 1950 |
| 2,670,055 | Dorman et al. | Feb. 23, 1954 |